United States Patent
Harris et al.

(10) Patent No.: US 11,751,694 B2
(45) Date of Patent: Sep. 12, 2023

(54) METHOD AND APPARATUS FOR CREATING A KNEELER PAD USING A THERMOFORMING PROCESS

(71) Applicant: CRAFTSMAN UPHOLSTERY & INTERIORS, LLC, Orem, UT (US)

(72) Inventors: Mark C. Harris, Spanish Fork, UT (US); Steven K. Hardle, Draper, UT (US)

(73) Assignee: Craftsman Upholstery & Interiors, LLC, Orem, UT (US)

( * ) Notice: Subject to any disclaimer, the term of this patent is extended or adjusted under 35 U.S.C. 154(b) by 0 days.

(21) Appl. No.: 17/037,001

(22) Filed: Sep. 29, 2020

(65) Prior Publication Data
US 2022/0095800 A1     Mar. 31, 2022

(51) Int. Cl.
| | |
|---|---|
| *A47C 16/04* | (2006.01) |
| *B29C 44/14* | (2006.01) |
| *B29L 31/00* | (2006.01) |
| *B29D 99/00* | (2010.01) |
| *B29D 22/00* | (2006.01) |

(52) U.S. Cl.
CPC ............ *A47C 16/04* (2013.01); *B29C 44/143* (2013.01); *B29D 22/00* (2013.01); *B29D 99/0092* (2013.01); *B29L 2031/751* (2013.01)

(58) Field of Classification Search
CPC ................................. A47C 16/04; A47C 16/00
USPC ........................................................ 297/204
See application file for complete search history.

(56) References Cited

U.S. PATENT DOCUMENTS

| | | | |
|---|---|---|---|
| 2,501,934 A * | 3/1950 | Howard, I | A47C 31/02 |
| | | | 24/265 C |
| 3,208,085 A | 9/1965 | Norman et al. | |
| 3,647,260 A | 3/1972 | Grant et al. | |
| 4,073,539 A | 2/1978 | Caruso | |
| 4,647,109 A | 3/1987 | Christophersen et al. | |
| 5,132,063 A | 7/1992 | Hughes | |
| 5,389,177 A | 2/1995 | Shuert | |
| 5,415,461 A | 5/1995 | Sakamoto | |
| 5,489,145 A | 2/1996 | Van Hekken | |
| 6,212,719 B1 | 4/2001 | Thomas et al. | |
| 6,783,184 B2 | 8/2004 | DiBattista et al. | |

(Continued)

FOREIGN PATENT DOCUMENTS

| | | |
|---|---|---|
| DE | 102004031782 A1 | 1/2006 |
| EP | 0340642 A2 | 11/1989 |

(Continued)

*Primary Examiner* — Milton Nelson, Jr.
(74) *Attorney, Agent, or Firm* — MORRISS O'BRYANT COMPAGNI CANNON, PLLC

(57) ABSTRACT

The present invention is a system and method for manufacturing a framework for a padded cushion in the shape of a kneeler pad, wherein the framework is created using a thermoforming process to make rigid and plastic top and bottom shells that are then coupled together to form a framework to which upholstery is added to thereby form a padded kneeling cushion, wherein a fabric tightening system is also installed in the framework that enables the upholstery to be stretched tighter over the framework in order to tighten the upholstery around the cushion as the upholstery loses its shape and stretches over time, and wherein a system is provided to extend a length of the kneeler pads through the addition of expansion segments in the framework.

8 Claims, 15 Drawing Sheets

(56) References Cited

U.S. PATENT DOCUMENTS

| | | | |
|---|---|---|---|
| 7,320,502 B1 * | 1/2008 | McCloskey | A47C 16/04 297/DIG. 6 |
| 8,356,373 B2 | 1/2013 | Allman et al. | |
| 8,998,316 B2 | 4/2015 | Naughton et al. | |
| 9,420,890 B2 | 8/2016 | Lee | |
| 2004/0051367 A1 | 3/2004 | Banovic et al. | |
| 2004/0224127 A1 | 11/2004 | DiBattista et al. | |
| 2011/0101744 A1 | 5/2011 | Naughton et al. | |
| 2014/0368019 A1 * | 12/2014 | Guillory | A47C 16/04 297/423.41 |
| 2015/0283929 A1 | 10/2015 | Velasco | |
| 2015/0336151 A1 | 11/2015 | Frost et al. | |

FOREIGN PATENT DOCUMENTS

| | | | |
|---|---|---|---|
| EP | 0970792 A2 | | 1/2000 |
| JP | 2022076314 A | * | 5/2022 |

* cited by examiner

METHOD AND APPARATUS FOR CREATING A KNEELER PAD USING A THERMOFORMING PROCESS

BACKGROUND

Field of the Invention

This invention relates generally to manufacturing a kneeler pad wherein a framework is created around which upholstery is applied. The size of the kneeler pad is adjusted by making segmented extensions that can be added to the framework of the kneeler pad to modify overall length.

Description of Related Art

The manufacturing of furniture that includes a rigid and plastic shell is well known to those skilled in the art. Such rigid and plastic shells have been used to make different types of furniture for use in such places as theaters, homes, and automobiles.

Manufacturing two halves of a rigid and plastic shell and then sealing them together may result in a structure that is hollow. The purpose of creating the hollow shell is that the amount of materials used in making the furniture can be significantly reduced. Furthermore, the overall weight of the furniture may also be significantly reduced.

However, one drawback of manufacturing a rigid, plastic, and hollow shell as a framework for furniture is that the size of the furniture is strictly limited to the size of the shell and whatever upholstery and padding that may be added to it.

A common method of creating a rigid, plastic, and hollow shell is through the process of injection molding. Injection molding requires the use of a mold. A mold is a static shape and made of a material that does not allow the mold to be changed between uses. In other words, the mold cannot be altered between uses to make a shell of a different size. The mold strictly limits the shell to the size and shape of the mold. Therefore, if furniture of the same shape but different size is desired, a completely new mold must be created for that purpose.

Another manufacturing method for creating a rigid and plastic shell is thermoforming. Thermoforming is a manufacturing process where a plastic sheet is heated to a pliable forming temperature, formed to a specific shape in a mold, and trimmed to create a usable product. The sheet is heated in an oven to a high-enough temperature that permits it to be stretched into or onto a mold and cooled to a finished shape. A simplified version of thermoforming is referred to as vacuum forming. It should be understood that thermoforming differs from injection molding, blow molding, rotational molding and other forms of processing plastics.

The process of creating a mold is generally expensive and therefore multiple sizes of the same mold are avoided. The injection molding process is thus reserved for situations where a mass-produced product having a single shape is desired. For example, seating is often an end-product of injection molding where the seating is considered a one-size-fits-all product that does not require modification.

Accordingly, it would be an advantage over the prior art to be able to make lightweight furniture comprised of a rigid, plastic, and hollow shell that can also be modified in at least one dimension without changing the mold to thereby have a plurality of different sizes of the furniture in at least one dimension and based on a single shape.

A different aspect of the prior art is the subject of the upholstery that is often applied to the rigid, plastic, and hollow shell. A situation that often presents itself with upholstery that is applied to a rigid, plastic, and hollow shell is that while the shell does not become deformed after repeated use, the upholstery will stretch and lose its shape.

Accordingly, it would be an advantage over the prior art to provide a system for tightening the upholstery on the shell and thereby extending the useful life of furniture.

BRIEF SUMMARY

The present invention is a system and method for manufacturing a framework for a padded cushion in the shape of a kneeler pad, wherein the framework is created using a thermoforming process to make rigid and plastic top and bottom shells that are then coupled together to form a framework to which upholstery is added to thereby form a padded kneeling cushion, wherein a fabric tightening system is also installed in the framework that enables the upholstery to be stretched tighter over the framework in order to tighten the upholstery around the cushion as the upholstery loses its shape and stretches over time, and wherein a system is provided to extend a length of the kneeler pads through the addition of expansion segments in the framework.

In a first aspect of the invention, the framework for the cushion is created using a thermoforming process instead of other plastic shaping processes.

In a second aspect of the invention, a length of the framework is extendable by making segmented extensions that can be added to the framework to extend its overall size in at least one dimension.

In a third aspect of the invention, a system is installed in the framework that enables the upholstery that is attached to the framework to be tightened and thereby extend the useful life of the finished product.

These and other embodiments of the present invention will become apparent to those skilled in the art from a consideration of the following detailed description taken in combination with the accompanying drawings.

DETAILED DESCRIPTION

Figure 1:
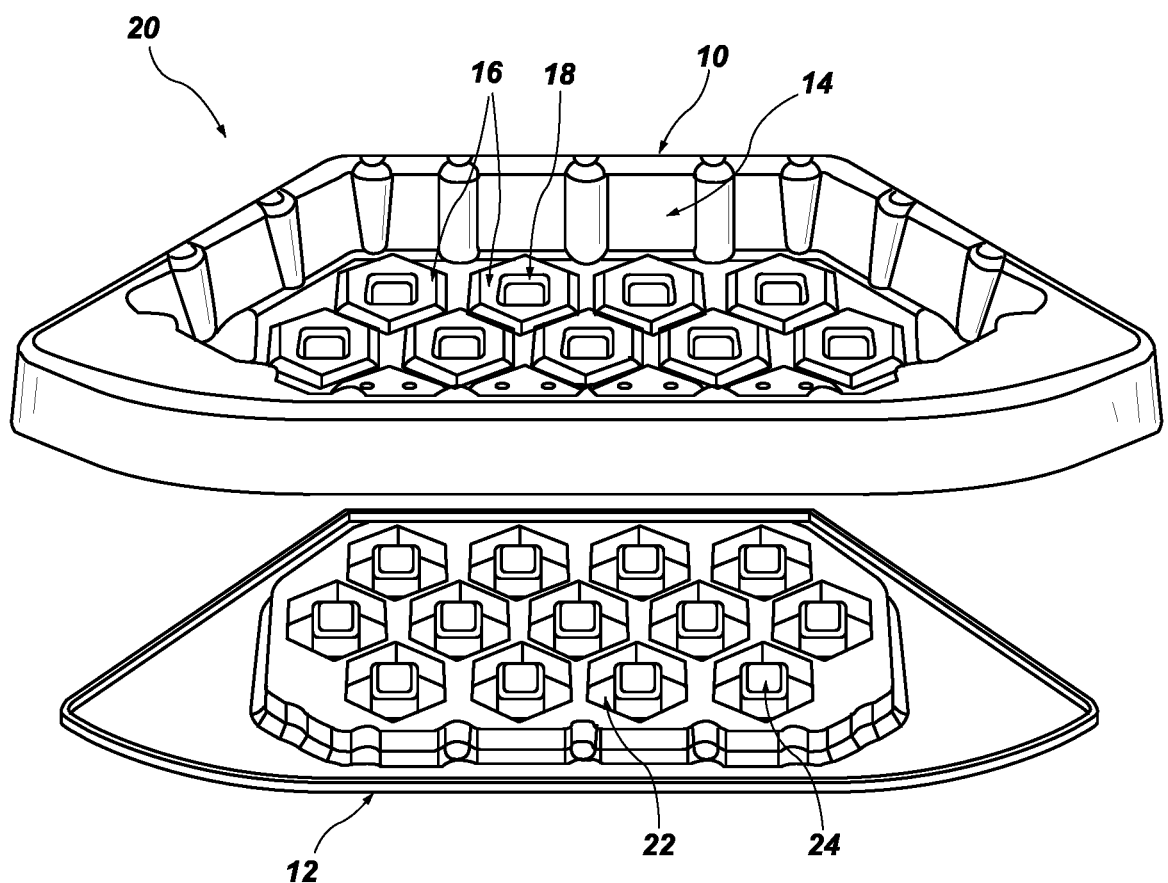
FIG. 1 is a perspective view of a kneeler pad shown with a bottom shell and a top shell.

Reference will now be made to the drawings in which the various embodiments of the present invention will be discussed so as to enable one skilled in the art to make and use the invention. It is to be understood that the following description illustrates embodiments of the present invention and should not be viewed as narrowing the claims which follow.

The embodiments of the present invention are directed to construction of a rigid and plastic shell that form a framework for a cushion, wherein the fabric may be tightened after stretching, and where the length of the cushion may be extended. By manufacturing a top shell and a bottom shell, the two halves may be joined together to form a rigid, plastic shell. The rigid shell may then be finished by adding padding and upholstery to create a padded cushion. This may be referred to as the upholstered portion of a kneeler pad. A final component that may be added to the upholstered portion is a base. The base may raise the upholstered portion off the ground and still provide access to a fabric tightening system.

While the embodiments of the invention are directed to the manufacturing of a cushion, a system of tightening fabric, and a system for extending the length of the cushion, the principles of the embodiments may be used to create other types of objects that are formed from rigid and plastic shells. Furthermore, the padded cushion may be referred to as a kneeler pad. A kneeler pad is defined herein as a padded cushion that is knelt upon by one or more persons, having a top padded side and a rigid bottom side. Nevertheless, the embodiments of the invention may be applied to other types of padded cushions other than kneeler pads.

The plastic forming process used in the embodiments of the invention may be directed to a process for forming ABS. Acrylonitrile Butadiene Styrene (ABS) is a common thermoplastic polymer typically used for plastic molding applications. This engineering plastic is popular due to its low production cost and the ease with which the material is machined by plastic manufacturers. Furthermore, its benefits of affordability and machinability do not hinder the ABS material's desired properties of impact resistance, structural strength and stiffness, chemical resistance, excellent high and low temperature performance, great electrical insulation properties, and being easy to paint and glue.

While it should be understood that any plastic forming processes may be used to form the components or shells of the embodiments of the invention, the particular process selected for these embodiments is the thermoforming process whereby a plastic sheet is heated to a pliable forming temperature, formed to a specific shape in a mold, and trimmed to create a usable product.

It is not an aspect of the embodiments of the invention to include the thermoforming manufacturing process as a part of the embodiments of the invention as this process is well known to those skilled in the art. However, as will be shown, it is an aspect of the invention to include novel features in the shells themselves regardless of how those shells are formed.

As shown in FIG. 1, the first step of the embodiments of the invention is to form a rigid top shell 10 and a rigid bottom shell 12 that may form the upholstered portion of a kneeler pad 20. FIG. 1 is a perspective view looking at the formed top shell 10 from above, and therefore showing the outside of the top shell. The top shell 10 also shows a large cavity 14 in a top surface where padding may be inserted to create a soft top side. The large cavity 14 may encompass most of the surface area of the top shell 10 while providing rigid sides that give the kneeler pad 20 structural strength. This large cavity 14 may then be filled with padding in order to fulfil its function as a padded cushion when kneeled upon.

Another feature of the top shell 10 is a plurality of raised projections 16 on a bottom surface 8 of the cavity 14. The projections 16 are shown as being hexagonal in shape to form a honeycomb design in the bottom of the cavity 14. However, while the honeycomb design is efficient, it should be understood that the projections may be any desired shape. The hexagonal shape was selected because it allowed a large number of offset projections 16 to be placed close together. In other words, the function of the hexagonal projections 16 is to provide a shape that efficiently covers the entire bottom surface 8 of the cavity 14.

The hexagonal projections 16 may also include an indentation 18 in the middle thereof. The function of the indentation serves a specific purpose in a fabric tightening system as will be explained later. The selection of the shape of the indentation 18 is also not a limitation of the embodiments of the invention. What is important is that the indentation 18 enables the insertion of a device (not shown) that is used in the fabric tightening system.

FIG. 1 is also a perspective view of the bottom shell 12. This view shows the inside of the bottom shell 12 that may be mated to the top shell 10 as shown. The top shell 10 and the bottom shell 12 may be brought together to form a rigid and plastic framework of a padded cushion or kneeler pad 20.

It should be noted that the hexagonal projections 16 on the top shell 10 have identical and spatially aligned hexagonal indentations 22 on the bottom shell 12. In other words, the bottom shell has a surface which is the physical inverse of the bottom surface 8 of the cavity 14 in the top shell 10. The purpose of aligning the hexagonal projections 16 and hexagonal indentations 22 are for the fabric tightening system to be described.

The plurality of hexagonal indentations 22 in the bottom shell 12 may also include a square projection 24 (as seen from the bottom side of the bottom shell 12) in the middle of each shape. Furthermore, the square indentations 18 in the top shell 10 may make contact with and be aligned with the square projections 24 in the bottom shell 12.

While the indentations 18 that align with the projections 24 are both shown as having a square outline, it should be understood that the outline may vary without interfering with the function of the embodiments. Thus, any convenient shape may be used for both the indentations 18 and the projections 24. Furthermore, the indentations 18 do not need to be the same shape as the projections 24. What is important is that they provide a location for access to the fabric tightening system.

Figure 2:
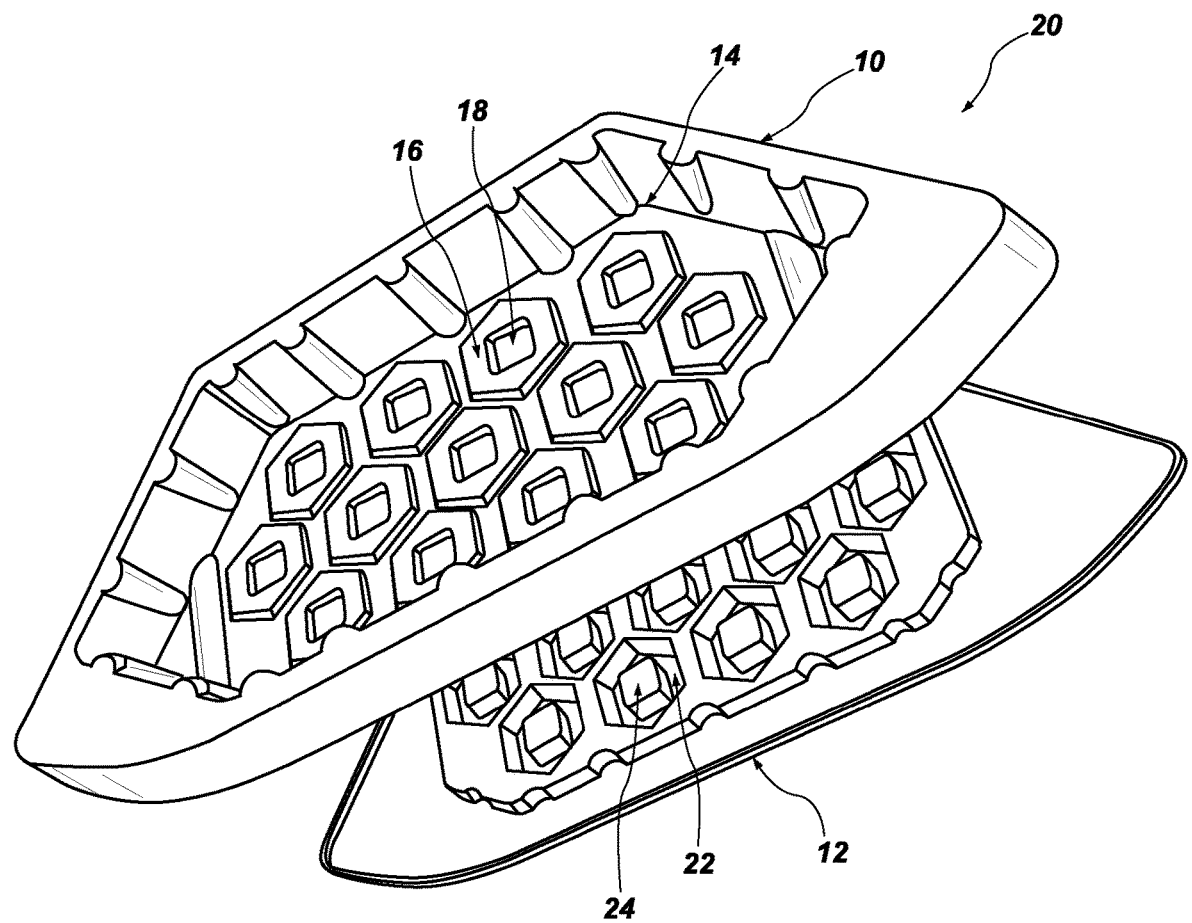
FIG. 2 is another perspective view of the kneeler pad shown in FIG. 1.

FIG. 2 is a perspective view of the top shell 10 and the bottom shell 12 that form the kneeler pad 20 shown in FIG. 1. FIG. 2 also shows a different angle inside the cavity 14, the hexagonal projections 16, and the square indentations 18 in the top shell 10. Similarly, the perspective view of the bottom shell 12 shows the hexagonal indentations 22 and the square projections 24 in the bottom shell 12.

Figure 3:
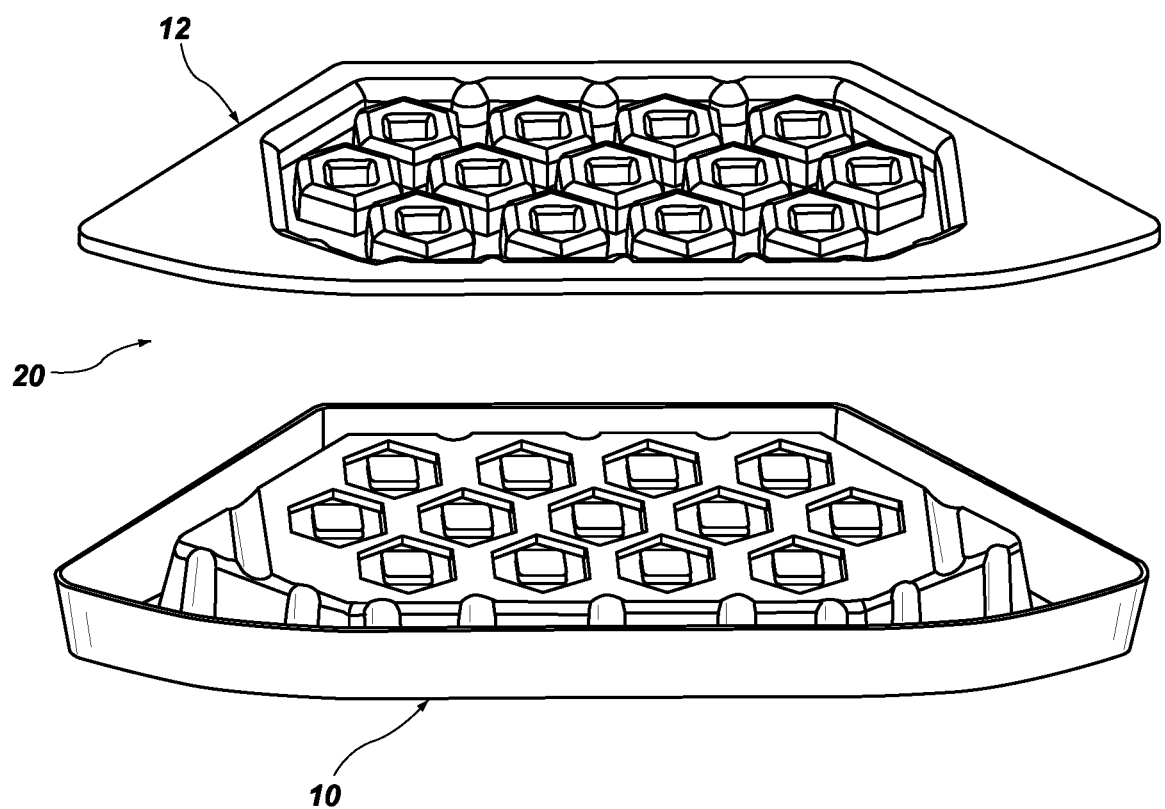
FIG. 3 is another perspective view of the kneeler pad shown in FIGS. 1 and 2, but with the bottom shell and the top shell flipped over.

FIG. 3 is a perspective view of the reverse sides of the top shell 10 and the bottom shell 12 shown in FIGS. 1 and 2, revealing the bottom side of the bottom shell 12 and the bottom side of the top shell 10 that form the kneeler pad 20.

Figure 4:
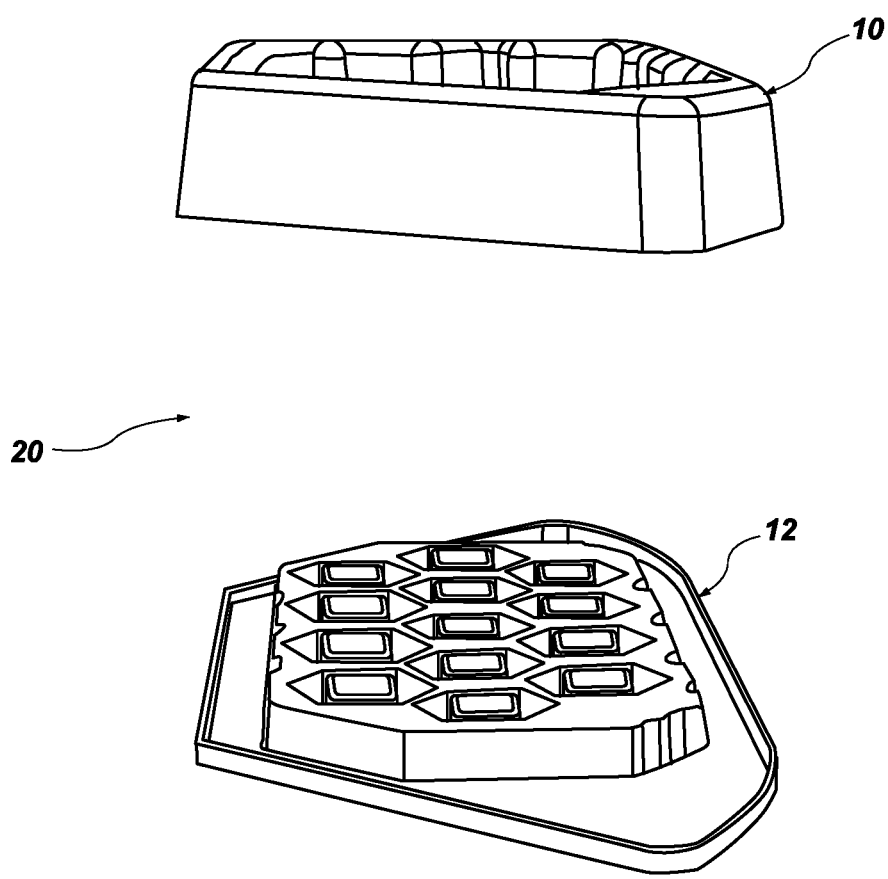
FIG. 4 is another perspective view of the kneeler pad but from a profile perspective.

FIG. 4 is a perspective and substantially profile view of the top shell 10 disposed over the bottom shell 12 before they are brought together and mated to form a framework of the upholstered portion of the kneeler pad 20.

The embodiments of the invention may also include a fabric tightening system. The fabric tightening system is provided so that when the upholstery on the top of the kneeler pad 20 becomes stretched over time as people sit and kneel on the kneeler pad, the fabric may be tightened and the useful life of the kneeler pad extended before it is reupholstered or replaced.

Figure 5:
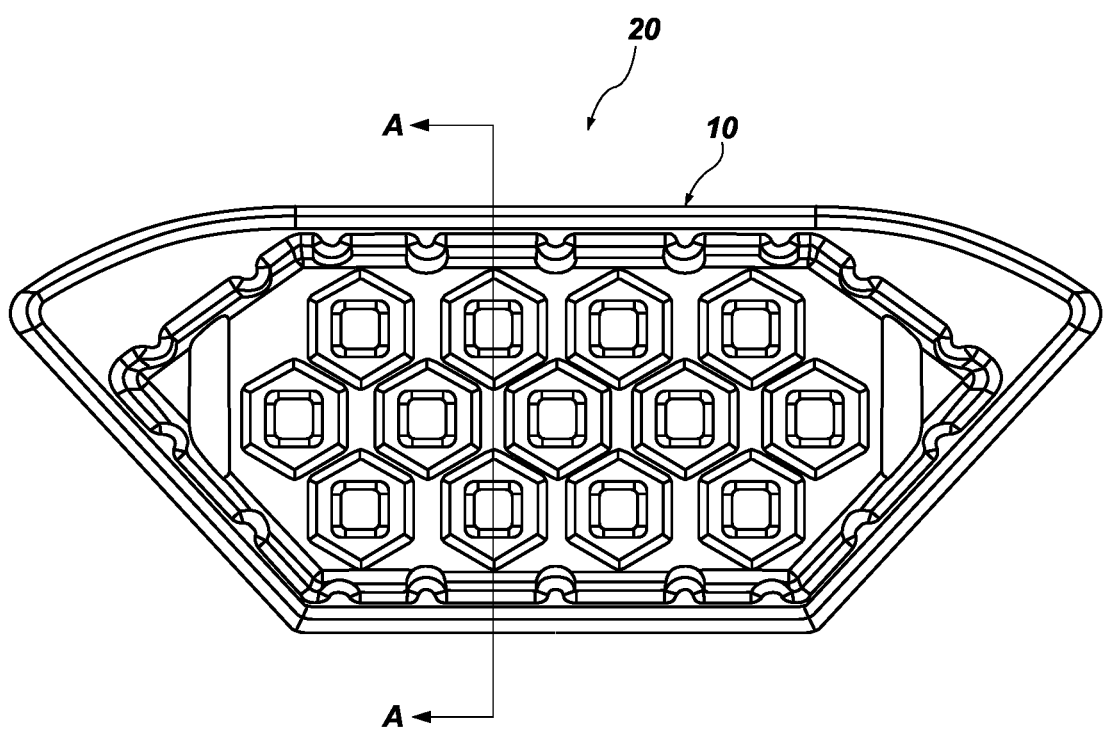
FIG. 5 is a top view of the top shell with line A-A bisecting the kneeler pad.

FIG. 5 is a top view of the top shell 10 with line A-A drawn through the top shell. Line A-A is provided as a convenient point to provide a cut-away view of the top shell 10 and the bottom shell 12.

Figure 6:
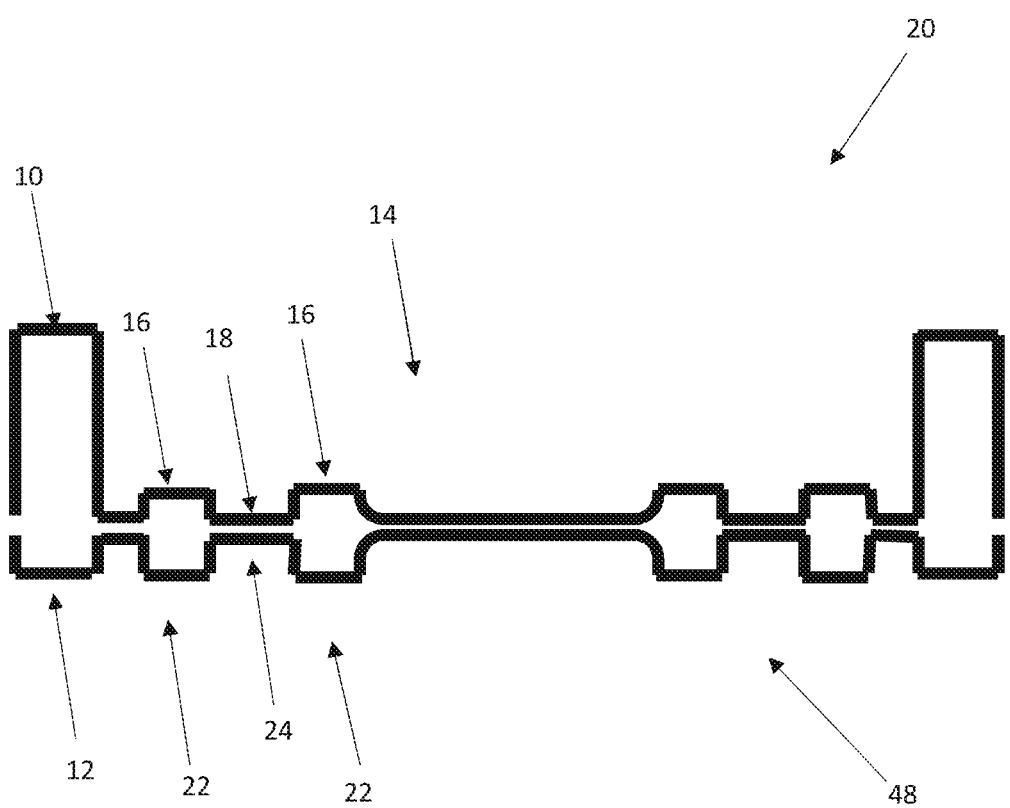
FIG. 6 is a profile and cut-away view of the top shell and the bottom shell from the perspective of line A-A.

FIG. 6 is a profile and cut-away view of the kneeler pad 20 that is formed of the top shell 10 and the bottom shell 12. This view is from the perspective of line A-A in FIG. 5 and shows the cavity 14 that is formed in the top shell 10. FIG. 6 also shows in this cut-away view the plurality of raised projections 16 and the plurality of indentations 18 in the top shell 10. Similarly, the plurality of indentations 22 and the plurality of projections 24 are shown in the bottom shell 12.

It should be understood that this figure is not being drawn to scale. Lengths of portions of the top shell 10 and the bottom shell 12 are exaggerated in order to more clearly illustrate features of the kneeler pad 20. Furthermore, there is shown a gap between the top shell 10 and the bottom shell 12. When the top shell 10 and the bottom shell 12 are joined tightly to create a framework 48 for foam and fabric, there will be no gap between the two shells 10, 12. They are tightly held together by the fabric tightening system.

Figure 7:
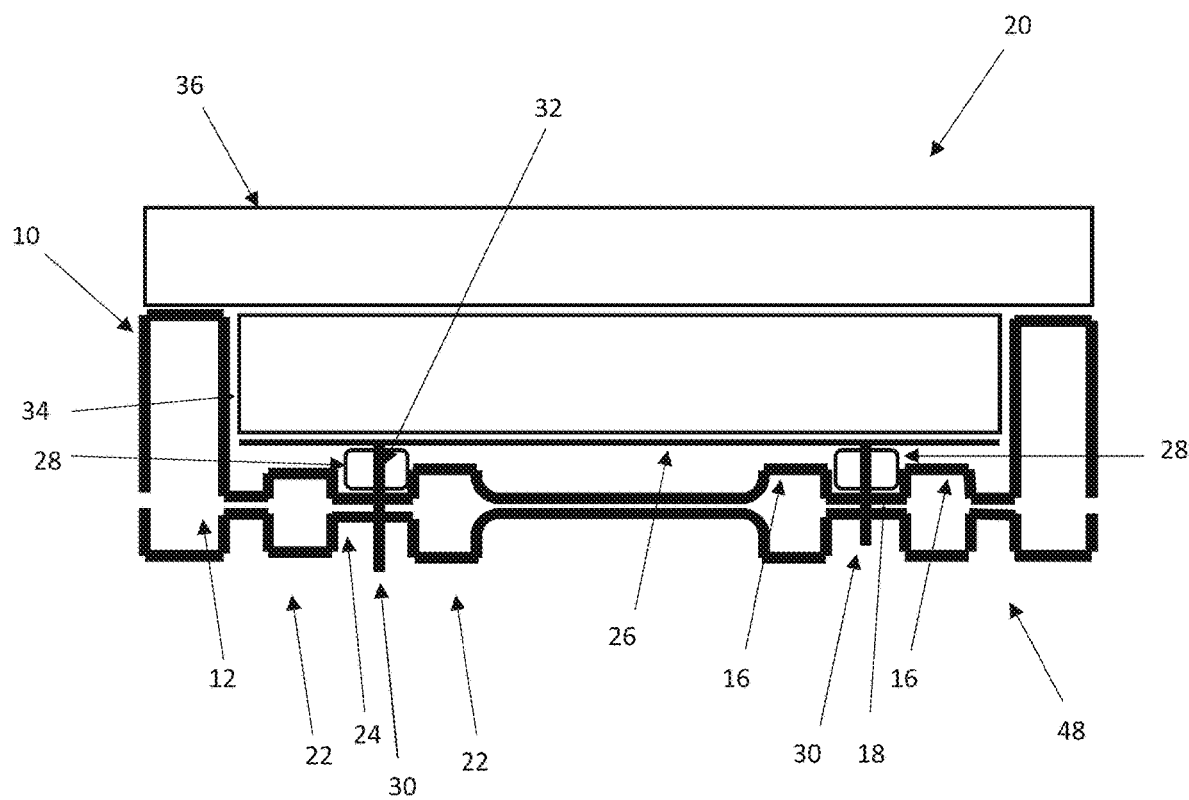
FIG. 7 is a profile and cut-away view of the kneeler pad shown in FIG. 6, but with the addition of fabric tightening elements and foam pads.

FIG. 7 is the profile view of FIG. 6 with additional components of the embodiments of the invention being added to the framework 48, including foam elements of the kneeler pad 20 and elements of the fabric tightening system.

While the top shell 10 and the bottom 12 form the framework 48 for foam and fabric, the kneeler pad 20 has not yet been constructed. However, before the foam elements may be added, it is first necessary to add elements of the fabric tightening system that must be disposed within the framework 48.

A first element of the fabric tightening system is a false floor or bottom plate 26 that rests at the bottom of the cavity 14 in the top shell 10. The bottom plate 26 may be a rigid material that does not easily flex so that it may apply pressure evenly when used in the fabric tightening system. When pressure is applied at any point underneath the bottom plate 26, the bottom plate may move as a single unflexed piece.

The bottom plate 26 is resting or floating on the honeycomb pattern of the raised projections 16 on the bottom surface 8 of the cavity 14. Disposed in each of the honeycombs or indentations 18 in the honeycomb pattern is a block thus forming a plurality of blocks 28 underneath the bottom plate 26, wherein each block includes a bolt 30 that can extend upwards from a center of each of the blocks. The blocks 28 are disposed in the bottom of the cavity 14 of the top shell 10. Each one of the blocks 28 may be disposed within one of the indentations 18. It is noted that the plurality of blocks will be incapable of turning if they are sufficiently large enough to make contact with the sides of the plurality of indentations 18 or have a shape that prevents turning.

For example, the indentations 18 may be multi-sided such as triangular, square, pentagonal, or hexagonal. The blocks 28 should be sufficiently large such that the blocks will hits the sides of the indentations 18 and not be able to turn. The indentations 18 could also be oval without any corners and the blocks 28 could still be prevented from turning.

Disposed through the center of each of the plurality of blocks 28, and out the bottom of the framework 48, is the bolt 30 that is able to be held in place when not being turned and pass through the top shell 10, the bottom shell 12, and the plurality of blocks 28 by the use of a T-nut 32. The T-nut 32 enables the bolt 30 to be turned and thus move forward (tightened) or backward (loosened) through the block 28 while the T-nut remains stationary within the block.

It should be noted that the blocks 28 may be disposed in all or only some of the indentations 18. The fabric tightening system may function with as few as two blocks 28 or with all of the indentations 18 filled with a block.

Figure 8:
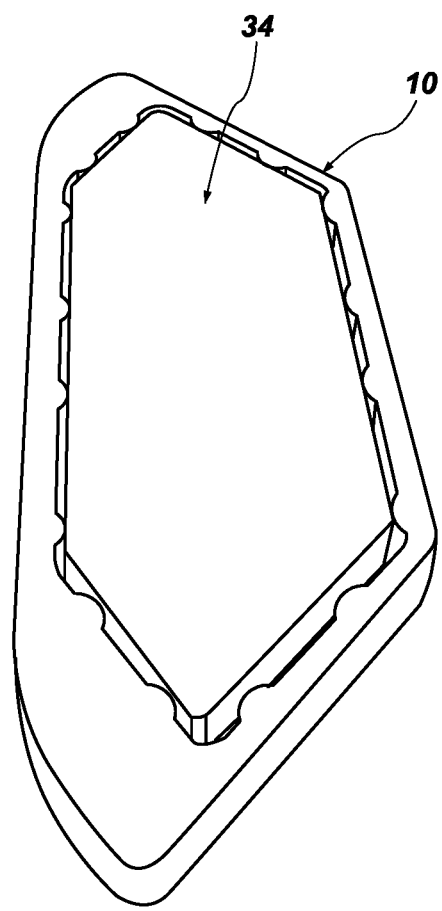
FIG. 8 is a perspective view of the top shell having the interior foam disposed in the cavity.

After the blocks 28 with T-nuts 32 and bolts 30 are positioned in the bottom of the cavity 14 and the bottom plate is disposed on top of them, the next step is to complete construction of the kneeler pad 20. Accordingly, resting on the bottom plate 26 is a block of interior foam 34 as shown in FIG. 8. As can be seen, the interior foam 34 is cut in order to conform to and fill the shape of the cavity 14 in the top shell 10.

Disposed on top of the interior foam 34 is a larger block of top foam 36. As a practical matter, the top foam 36 may be cut ⅛" larger than the edges of the top shell 10 with a 1 degree angle inward toward the center of the top foam. The top foam 36 is therefore a slightly larger image of the outline of the top shell 10.

There may be finishing touches made to the top foam 36 in order to enable the kneeler pad to have straight or beveled edges. For example, there are cuts that may be made in the top foam 36 to assist in keeping the edges a desired shape when the fabric 38 is being added and pulled tight around the top foam 36, and these features are considered to be known to those skilled in the art. However, it is noted that a ½ ounce layer of bonded DACRON™ may be added to the fabric 38 to thereby soften and smooth the underside of the fabric 38.

The interior foam 34 and the top foam 36 may be comprised of any furniture foam that is used in the industry and known to those skilled in the art.

The purpose of the plurality of blocks 28 is to reinforce the top shell 10 so that the bolts 30 can be screwed through both the bottom shell 12 and the top shell 10 without cracking or causing any damage to the shells. The blocks 28 may be any appropriate size, but in the embodiments shown here, they are approximately 1.5 by 1.5 inches and approximately 0.75 inches thick. The corners of the blocks 28 may be rounded to facilitate fitting into the indentations 18 but it is not required. It should be understood that these dimensions are an example only and should not be considered a limitation of the embodiments of the invention.

It should also be noted that the blocks 28 may or may not extend beyond an upper edge of the indentations 18. In FIG. 7, the blocks 28 are shown extending above the upper edge of the indentations 18 but could also be shown as below the upper edge.

The plurality of blocks may be adhered to the bottom of the indentations 18 using an appropriate contact adhesive and should be allowed to thoroughly dry. Once the adhesive has dried, the next step is to drill a hole through the bottom shelf 12, the top shelf 10, and the center of the blocks 28. The user should take care not to shatter the plastic of the top shelf 10 or the bottom shelf 12 when drilling the hole. The next step is to install a T-nut 32 into each of the blocks 28. The bolts 30 are then screwed into the T-nuts 32.

Alternatively, the hole may be pre-drilled through the blocks 28 and the top shell 10 and the bottom shell 12 before the blocks are adhered to the top shell 10.

Figure 9:
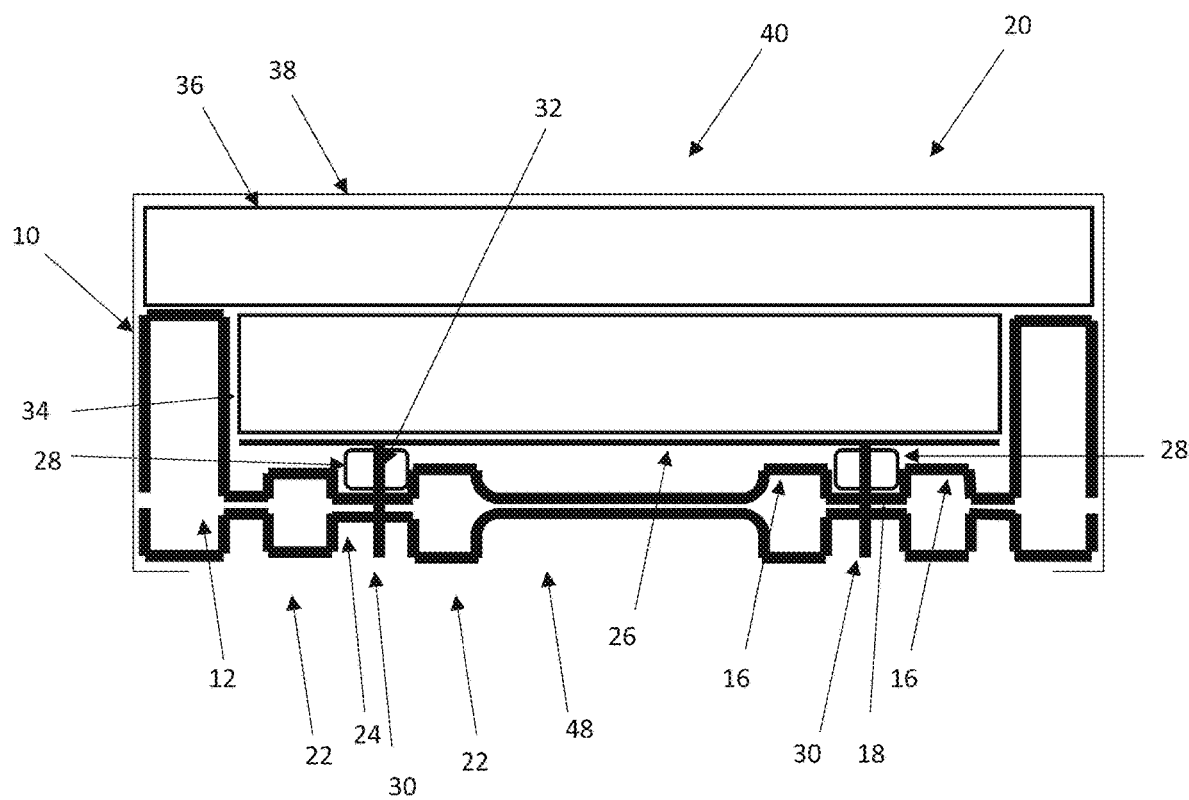
FIG. 9 is the same view as shown in FIG. 7 with the addition of fabric disposed over the foam pads and top shell.

As shown in FIG. 9, upholstery fabric 38 or whatever covering is appropriate is disposed over the top foam 36 and coupled to the framework 48 to form the upholstered portion 40. For example, the fabric 38 may be stapled to the bottom shell 12. This upholstering process may proceed as follows. Once all the foam has been added to the framework 48 of the kneeler pad 20, it is time for upholstery. The kneeler pad 20 may have a waterfall style upholstery from front to back with side boxings added on the ends. The side boxings may coincide with mitered sides that will go by the corners of the furniture that the kneeler pads are disposed against. The nap direction on the kneeler pads 20 may all face the same direction so that the nap is all facing away from a person entering a room.

Once the fabric 38 has been sewn into a cover that leaves about 2 inches of overhang on each side, the cover is disposed over the framework 48 and both front corners are stapled in place, followed by the back two corners. It may be desirable to have the boxing slip down the side on each part of the corners a little, so the seam is hidden from view as much as possible. After the corners are fastened in place and are all an equal distance from the bottom of the kneeler pad 20, then the sides are finished by adding staples to the front, center, and back to fasten the fabric 38 in place. It should be understood that the fabric may be stapled directly to the top framework 48.

Once this is completed, the upholsterer works from the center to the outside of the kneeler pad 20. Because the corners curve, it may be necessary to compress and stretch the fabric 38 as the corner is turned thereby getting rid of all wrinkles. Once this process has been completed on both sides, the upholsterer completes the front side, while paying attention to keeping a nice straight edge.

Once the upholsterer has completed attaching the fabric 38 around the framework 48, the bolts 30 should be inserted into the T-nuts 32 and turned so that they are inserted far enough through the blocks 28 until they just make contact with the bottom plate 26 but are not applying an upward force against the bottom plate. The bolts 30 should not be inserted any farther into the T-nuts 32 until they are needed to stretch the fabric 38.

It should be apparent that the blocks 28 will remain in place at the bottom of the indentations 18 even as the bolts 30 will extend farther into the cavity 14 as the bolts are tightened. Thus, the blocks 28 and the plastic of the top shell 10 and the bottom shell 12 function as a fulcrum to enable tightening of the fabric 38 as the bottom plate is pushed upwards.

When the fabric 38 on the kneeler pad 20 is getting loose and wrinkles start to appear, the fabric tightening system may then be used to remove the wrinkles from the fabric. This may be accomplished by turning the bolts 30 so they travel up through the end of the blocks 28 and extend into the cavity 14.

As each bolt 30 is tightened and begins to move into the cavity 14, the bottom plate 20 is pushed upwards out of the cavity. For example, the bolts 30 may each be turned a quarter turn. Turning the bolts 30 will raise the bottom plate 26 off the bottom of the cavity 14 and cause it to push against the interior foam 34 and the top foam 36. As the interior foam 34 and the top foam 36 are raised by the bottom plate 26, the fabric 38, which is still being held in place where it attaches to the framework 48, will be stretched tighter and thus removing any wrinkles.

It should be understood that the bolts 30 may be turned more or less than a quarter turn in order to accomplish the stretching of the fabric and should not be considered to be a limitation of the embodiments. This process of turning or tightening the bolts 30 to stretch the fabric 38 may be repeated as often as necessary to keep the fabric 38 tight on the kneeler pad 20.

A last step in construction of the kneeler pad 20 is to attach the completed upholstered portion 40 comprised of the embodiments as shown in FIG. 9 to a base 42. The base 42 may be any structure that provides a platform to keep the upholstered portion 40 off of the floor when being used. The base 42 is typically going to be low in height and may range from a quarter inch to any desired height. The base 42 may be comprised of any appropriate materials including the plastic that is used to form the top shell 10 and the bottom shell 12.

Figure 10:
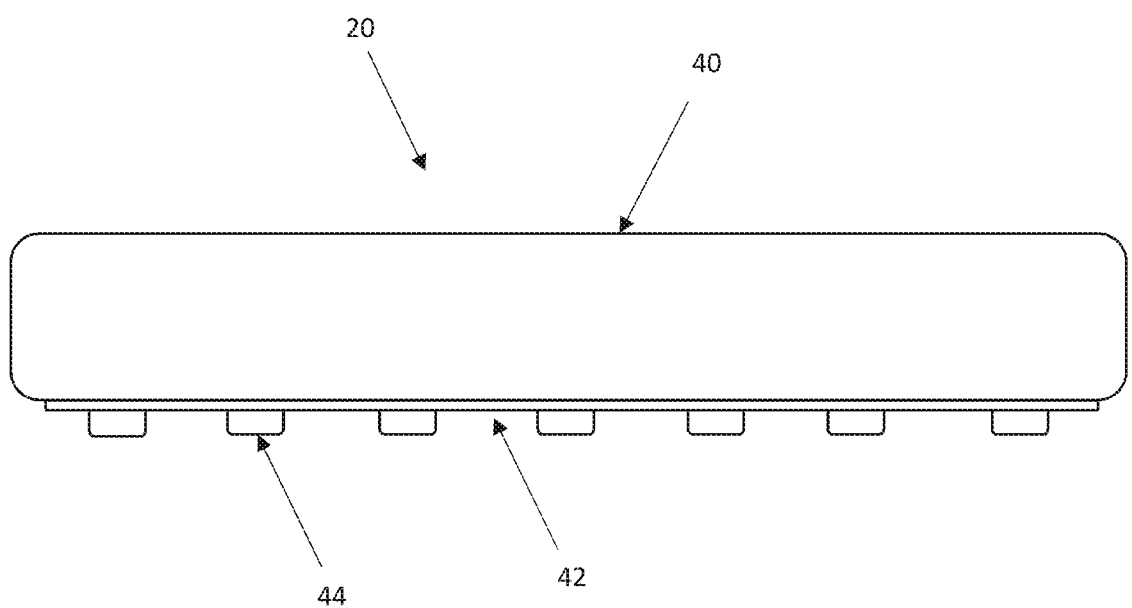
FIG. 10 is a profile view of the complete kneeler pad 20 including the upholstered portion and the base.

FIG. 10 is a profile view of the upholstered portion 40 and the base 42 that is coupled to the upholstered portion. The base 42 may be attached by any temporary means that may be convenient. For example, VELCRO™ may be used to adhere the upholstered portion 40 to the base 42. The base 42 may also form a friction fit with the upholstered portion to make removal of the base a simple procedure.

The base 42 may include any desired number of supports 44 which run in any desired direction under the upholstered portion 40. In addition, holes of an appropriate size should be made through the base 42 so that the screws 30 may be accessed through the base without having to remove it from the upholstered portion 40. Thus, the fabric tightening system may be used without removing the base 42.

Figure 11:
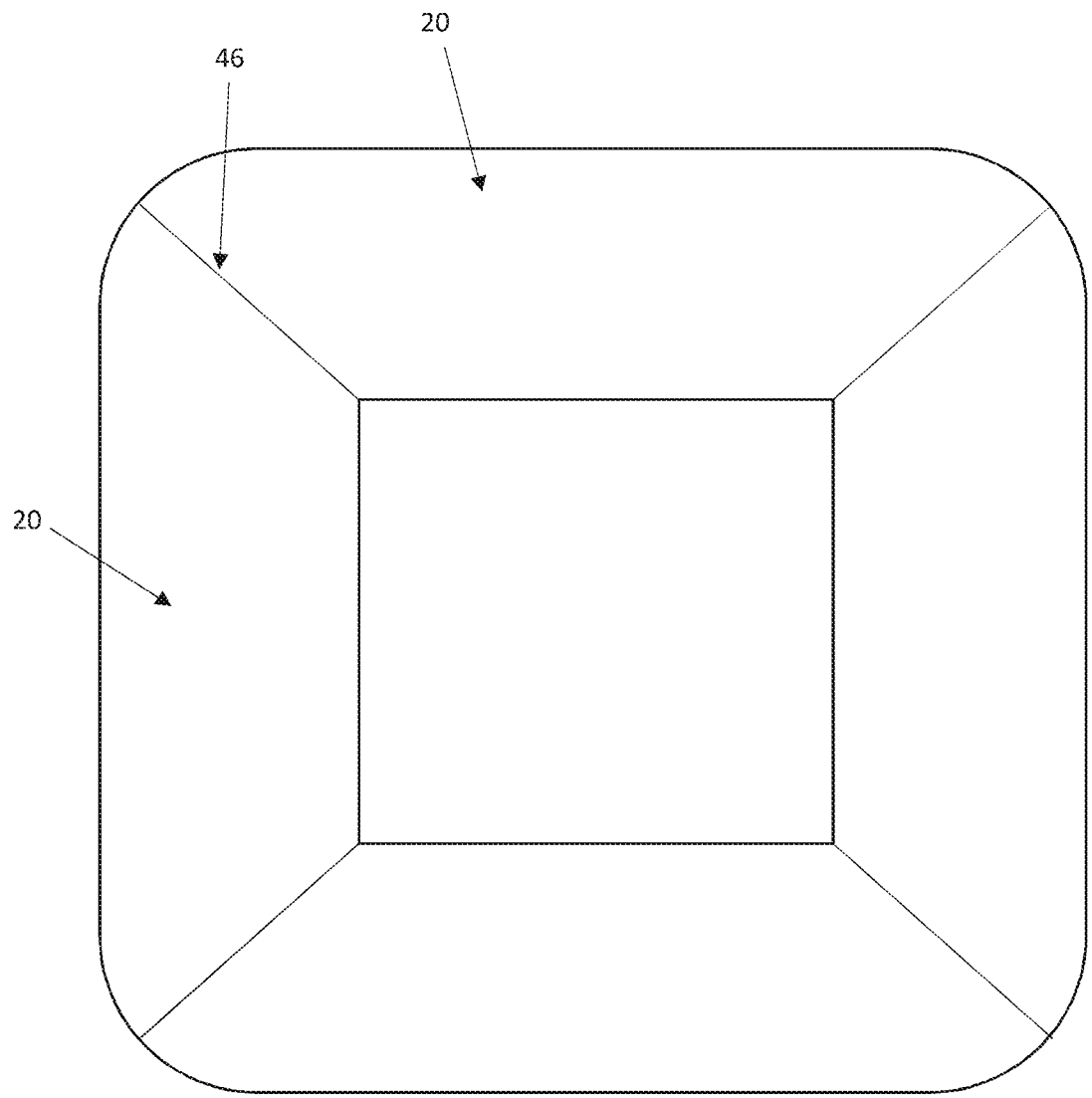
FIG. 11 is a top view of four kneeler pads being coupled together to form a square.

FIG. 11 is a top view that demonstrates another feature that may be part of the embodiments of the invention. This feature is a means for coupling kneeler pads 20 to each other so that they don't come apart from each other while being used. For example, two or more kneeler pads 20 might be coupled to each other along a diagonal face 46. The coupling device may be complementary magnets that are attached to each of the diagonal faces 46 of the kneeler pads 20. The coupling device may also be VELCRO™ or any other means that keeps the kneeler pads 20 together but also allows for easy separation.

If four kneeler pads 20 are coupled together as shown in FIG. 11, they may form a square or rectangle around a central structure. Thus, the kneeler pads 20 may meet along the diagonal faces 46 as shown to create a padded kneeling surface all the way around a central structure.

It should be understood that the kneeler pad 20 may also be elevated to form a bench for sitting. The kneeler pad 20 may be elevated by providing a taller base 42 or an appropriately sized bench structure on which the kneeler pad may rest.

A final feature of the embodiments of the invention is an ability to modify a length of the kneeler pad. It was explained previously that the top shell 10 and the bottom shell 12 are formed as single and complete pieces and then brought together to form a framework. However, the top shell 10 and the bottom shell 12 may actually be constructed of multiple pieces and then joined together to form the complete framework.

Figure 12A:
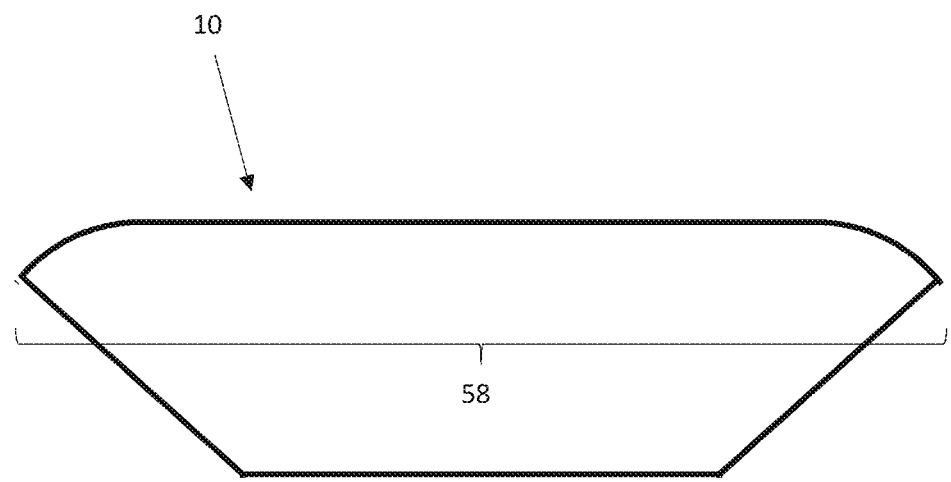
FIG. 12A is a top view of the outline of the top shell.

Another aspect of the invention is directed to the process of manufacturing the top shell 10 and the bottom shell 12 having different lengths. For example, FIG. 12A shows an outline of a top shell 10 or bottom shell 12 from above. The length 58 of the top shell 10 may be defined as the longest measurement of the top shell that extends between the outer corners 70.

Figure 13:
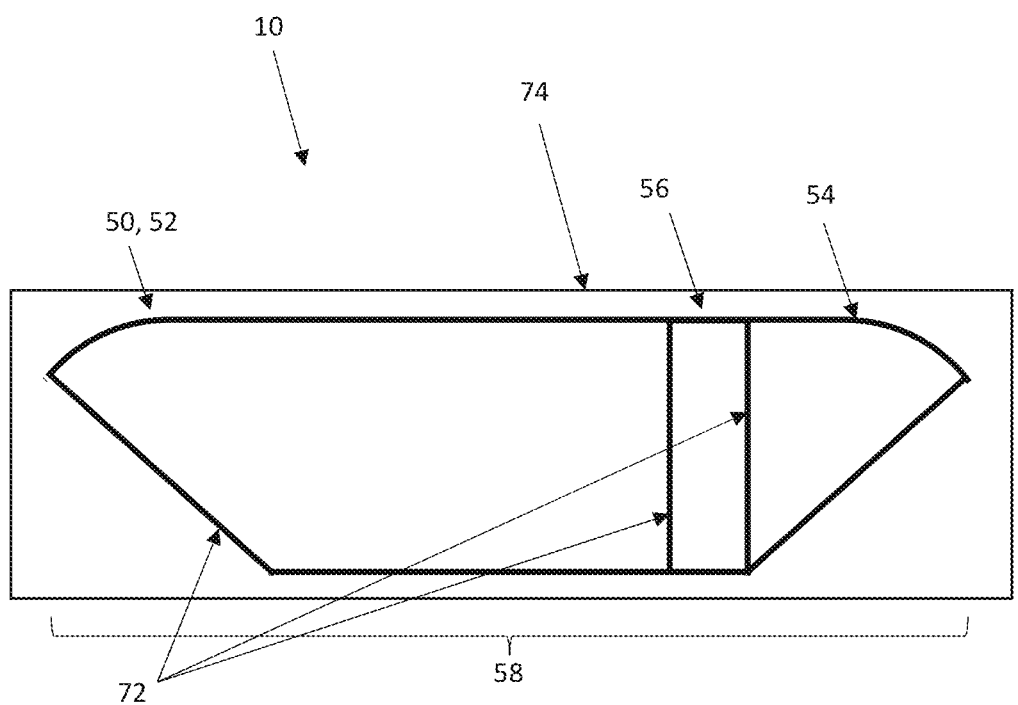
FIG. 13 is a top view of top shell with only two components being separated to accept an inserted segment to extend the length of the finished kneeler pad.

In the first embodiment, the top shell 10 is formed as a single component of ABS plastic. To manufacturer the top shell 10 or the bottom shell 12, a shell mold form is used. The form can be made of any appropriate material. In FIG. 13, a form 72 is shown that is manufactured from fiberglass. The thermoforming process enables the ABS material to be suctioned over the shell mold 72 and create the top shell 10 as is known to those skilled in the art.

However, in another aspect of the first embodiment, the shell mold 72 may be modified in order to enable top shells 10 and bottom shells 12 of different lengths to be manufactured. This may be accomplished by modifying the shell mold 72. FIG. 13 shows that the shell mold is made of separate shell mold components. These shell mold components are a middle mold section 50, a right end mold section 52, and a left end mold section 54. These shell mold components 50, 52, 54 are held in place on a substrate 74 using projections such as pegs disposed on a bottom edge of the mold components. The pegs (not shown) fit into holes (not shown) in the substrate 74.

Figure 12B:
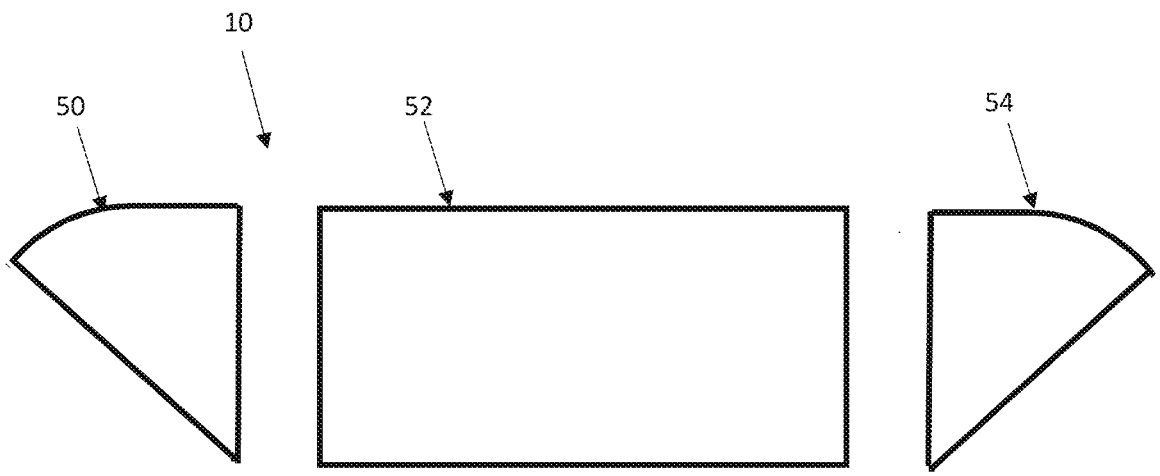
FIG. 12B is a top view of the separate components that can be made and separated in order to allow the insertion of segments that can extend the length of the finished kneeler pad.

FIG. 12B shows that the top shell 10 has been formed from a mold of three separate shell mode components 50, 52, 54. A total length 58 of the top shell 10 may be modified. The length 58 of the top shell 10 may be defined as the long axis which is being shown as left to right in FIG. 12A.

Figure 12C:
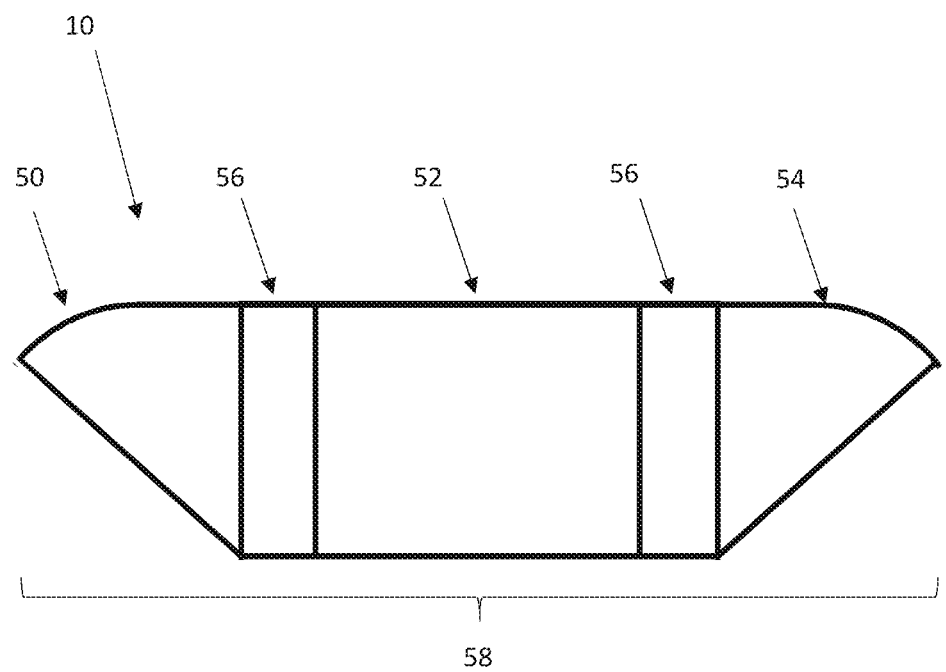
FIG. 12C is a top view of the separate components and two segments that have been added to the top shell to extend the length of the finished kneeler pad.

As shown in FIG. 12C, the length 58 of the top shell 10 may be extended by adding additional extension mold segments 56 to either side of the middle mold section 52 of the top shell 10. The additional extension mold segments 56 may be added to just one side of the middle mold section 52, to the other side, or to both sides. It should also be understood that any number of extension mold segments 56 may be added to the mold of top shell 10 until the total length 58 of the top shell 10 is the desired length needed for the kneeler pad 20. Accordingly, one extension mold segment 56 up to any number of extension mold segments may be added to the mold of the top shell 10.

When it is time to attach the various components together to form a complete top shell 10, the substrate 74 shown in FIG. 13 provides this necessary structure. The substrate 74 may be comprised of any material that does not interfere with the creation of the mold for top shell 10. In one embodiment, the substrate 74 is wood and is disposed underneath all of the shell mold components 50, 52, 54, and 56. The various shell mold components 50, 52, 54, and 56 may be disposed on the substrate 74 and aligned using the pegs in the bottom of the shell mold components and corresponding holes for the pegs in the substrate.

While the description of FIGS. 12A, 12B, and 12C have been used to describe modifications to the total length 58 of the top shell 10, it should be understood that the same modifications may be made in the same way to the bottom shell 12 in order to obtain top and bottoms shells 10, 12 that have the same total length.

From FIG. 13 it should also be understood that the shell mold components 50 and 52 for the top shell 10 might not need to be made separately in order to extend the length of the top shell. Thus, if shell mold components 50 and 52 are not made separately, and the right end mold section 54 is separated or made separately, then one or more extension mold segments 56 may be added between shell mold components 50, 52 and 54 as shown in FIG. 13 to extend the total length 58.

Figure 14:
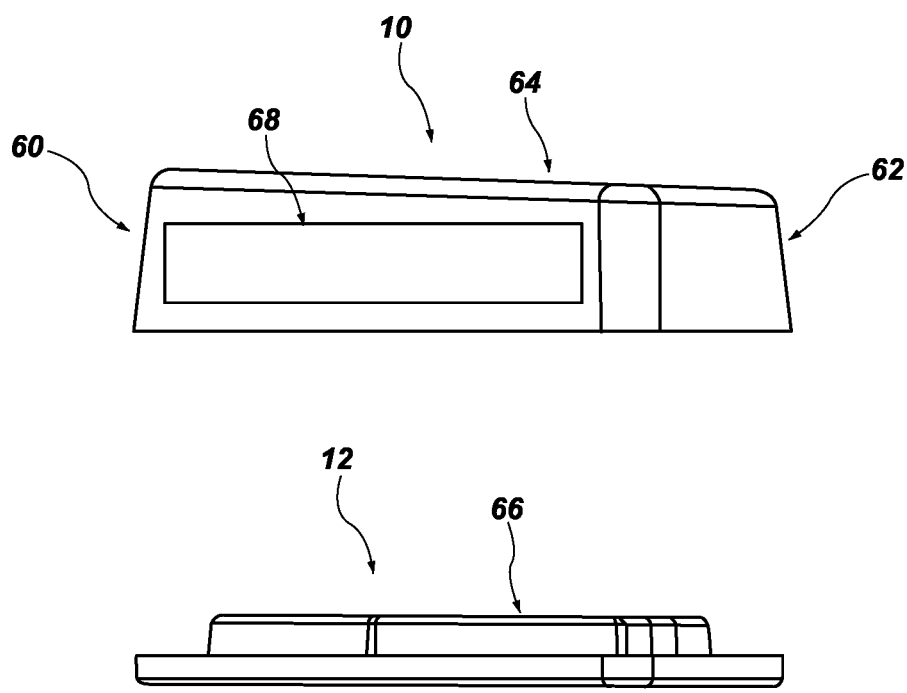
FIG. 14 is a profile view of a side of the top shell and the bottom shell that shows that the top shell may have a slanted top surface.

FIG. 14 is a profile view of the top shell 10 and the bottom shell 12 as seen from a side. In another aspect of the embodiments of the invention, it should be understood that a top surface 64 of the top shell 10 may be slanted with respect to a top surface 66 of the bottom shell 12. FIG. 14 shows that a shorter front edge 60 of the top shell 10 is higher than a longer back edge 62. Thus, the top shell 10 has a downward sloping top surface 64 or gradient from the front edge 60 towards the back edge 62. It should be understood that the top shell 10 can provide a sloping surface in any desired direction.

Another aspect of the embodiments is the option of reinforcement of the top shell 10. Reinforcement may be accomplished using any suitable material. For example, the vertical outer sides of the top shell 10 may be given a plywood reinforcement 68. Plywood is preferred as a reinforcement material in order to reduce the weight of the completed kneeler pad 10. Preferably the plywood reinforcement may be 0.25" to 0.375" thick. This is accomplished by adding construction adhesive to the plywood reinforcement 68 and then clamping it to one or more sides of the top shell 10 while also adding small screws to the sides. These screws may then be removed later once the adhesive sets up, but if they are not in the way, they may be left where they are in the plywood reinforcement 68.

It should also be understood that while the embodiments above are directed to a cushioned kneeler pad, the principles of the embodiments may be applicable to any padded furniture that may require a system for removing wrinkles from stretched upholstery, and a system for extending a length of the furniture when it is based on a thermoforming or mold process to create rigid and plastic forms for the furniture.

In summary, a first embodiment of the invention is a padded cushion having a fabric tightening system, wherein the padded cushion is comprised of a framework for the cushion, wherein the framework includes a cavity in a top surface thereof, wherein the cavity has a bottom surface, a lifting device disposed on the bottom surface of the cavity, wherein the lifting device may be actuated through a bottom surface of the framework, a bottom plate disposed within the cavity and on top of the lifting device, wherein the bottom plate is not attached to but is floating within the cavity and on the lifting device, and wherein the bottom plate is rigid, at least one interior foam pad disposed on top of the bottom plate and in the cavity of the framework, at least one top foam pad disposed on top of the at least one interior foam pad and on a top edge of the framework, and upholstery fabric disposed on top of the at least one top foam pad, around an exterior of the framework, and coupled to the bottom surface of the framework.

The first embodiment is also comprised of a mold for forming shell components of a kneeler pad, wherein the mold is comprised of the planar substrate having the plurality of holes on a surface thereof for alignment purposes, wherein shell mold components of either a top shell or a bottom shell are disposed in a desired arrangement on the substrate surface, wherein the shell mold components are comprised of a right end mold section, a middle mold section, and a left end mold section, wherein the middle mold section is substantially rectangular, wherein the right end mold section, the middle mold section, and the left end mold section are disposed on the substrate to thereby form the mold for a top or a bottom shell, wherein the plurality of shell mold components include a plurality of projections on a bottom edge, wherein the plurality of projections fit into the plurality of holes in the substrate to align the shell mold components in a desired location with respect to each other.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A padded cushion having a fabric tightening system, said padded cushion comprised of:
    a framework for the cushion, wherein the framework includes a cavity in a top surface thereof, wherein the cavity has a bottom surface;
    a lifting device disposed on the bottom surface of the cavity, wherein the lifting device may be actuated through a bottom surface of the framework;
    a bottom plate disposed within the cavity and on top of the lifting device, wherein the bottom plate is not attached to but is floating within the cavity and on the lifting device, and wherein the bottom plate is rigid;
    at least one interior foam pad disposed on top of the bottom plate and in the cavity of the framework;
    at least one top foam pad disposed on top of the at least one interior foam pad and on a top edge of the framework; and
    upholstery fabric disposed on top of the at least one top foam pad, around an exterior of the framework, and coupled to the bottom surface of the framework.

2. The padded cushion and fabric tightening system as defined in claim 1 wherein the padded cushion is further comprised of a plurality of framework holes through the bottom surface of the framework so as to provide access to the lifting device.

3. The padded cushion and fabric tightening system as defined in claim 2 wherein the padded cushion is further comprised of a base disposed on the bottom surface of the framework, wherein the base includes a plurality of base holes, wherein the plurality of base holes are aligned with the plurality of framework holes.

4. The padded cushion and fabric tightening system as defined in claim 3 wherein the framework is further comprised of a top shell and a bottom shell, wherein the top shell includes the top surface and the cavity disposed therein.

5. The padded cushion and fabric tightening system as defined in claim 4 wherein the bottom surface of the cavity is further comprised of a plurality of indentations that are substantially evenly spaced along the bottom thereof, and wherein each of the plurality of framework holes are disposed in a center of each of the plurality of indentations.

6. The padded cushion and fabric tightening system as defined in claim 5 wherein the bottom surface is further comprised of a honeycomb structure to increase structural integrity of the framework, wherein a center of each honeycomb of the honeycomb structure corresponds to each of the plurality of indentations.

7. The padded cushion and fabric tightening system as defined in claim 6 wherein the bottom shell is further comprised of a top surface that is a physical inverse of the bottom surface of the cavity in the top shell.

8. The padded cushion and fabric tightening system as defined in claim 7 wherein the lifting device is further comprised of:
    a block disposed in each of the plurality of indentations on the bottom surface of the cavity;
    a block hole disposed through a center of each of the blocks, wherein each of the block holes has an axis that is aligned with the plurality of framework holes;
    a T-nut disposed in each of the plurality of framework holes; and
    a bolt disposed in each of the T-nuts in the blocks, wherein a top surface of each bolt is in contact with a bottom surface of the bottom plate.

* * * * *